United States Patent
Kasubata et al.

(10) Patent No.: US 9,212,881 B2
(45) Date of Patent: Dec. 15, 2015

(54) HOLE EXAMINING DEVICE

(75) Inventors: Yoshitake Kasubata, Tokyo (JP); Masaaki Ishii, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 254 days.

(21) Appl. No.: 13/878,511

(22) PCT Filed: Nov. 8, 2011

(86) PCT No.: PCT/JP2011/075752
§ 371 (c)(1),
(2), (4) Date: Apr. 9, 2013

(87) PCT Pub. No.: WO2012/063833
PCT Pub. Date: May 18, 2012

(65) Prior Publication Data
US 2013/0192076 A1    Aug. 1, 2013

(30) Foreign Application Priority Data
Nov. 9, 2010    (JP) .................... 2010-251314

(51) Int. Cl.
*G01B 3/22*    (2006.01)
*G01B 3/00*    (2006.01)
(Continued)

(52) U.S. Cl.
CPC *G01B 3/00* (2013.01); *G01B 5/012* (2013.01); *G01B 5/12* (2013.01); *G01B 3/16* (2013.01);
(Continued)

(58) Field of Classification Search
CPC .............. G01B 5/08; G01B 5/12; G01B 3/26; G01B 3/16; G01B 3/28; G01B 21/14; G01B 3/00

USPC ............. 33/544.2, 544.3, 178, 544.5, 501.45, 33/560, 542
See application file for complete search history.

(56) References Cited

U.S. PATENT DOCUMENTS 2,767,478 A * 10/1956 Adams ........................ 33/501.05
3,676,776 A *  7/1972 Bauer et al. .................. 324/72.5
(Continued)

FOREIGN PATENT DOCUMENTS

JP    57-142501 A    9/1982
JP    1-126505 U    8/1989
(Continued)

OTHER PUBLICATIONS

Written Opinion of the International Search Authority for PCT/JP2011/075752, mailing date of Jan. 31, 2012 (Non-English).
(Continued)

*Primary Examiner* — Laura Martin
*Assistant Examiner* — Rhyan C Lange
(74) *Attorney, Agent, or Firm* — Westerman, Hattori, Daniels & Adrian, LLP (57) ABSTRACT

In a hole examining device, an examination head (105) is supported to be movable in an X direction and a Y direction which are orthogonal to each other, measurement heads (125, 126) are supported to be movable in a Z direction which is orthogonal to the X direction and the Y direction with respect to the examination head (105), and a plurality of first measurers (127) and a plurality of second measurers (128) are arranged in the measurement heads (125, 126) in parallel and may be held at an advance position which advances as well as retreats with respect to the Z direction, thereby improving workability of an examining operation.

6 Claims, 10 Drawing Sheets

(51) Int. Cl.
  *G01B 5/012* (2006.01)
  *G01B 5/12* (2006.01)
  *G01B 1/00* (2006.01)
  *G01B 5/00* (2006.01)
  *G01B 3/50* (2006.01)
  *G01B 3/16* (2006.01)
  *G01B 3/28* (2006.01)
  *G01B 5/08* (2006.01)
  *G01B 3/20* (2006.01)
  *G01B 21/14* (2006.01)
  *G01B 3/26* (2006.01)

(52) U.S. Cl.
  CPC ... *G01B 3/20* (2013.01); *G01B 3/26* (2013.01); *G01B 3/28* (2013.01); *G01B 5/08* (2013.01); *G01B 21/14* (2013.01)

(56) References Cited

U.S. PATENT DOCUMENTS

| | | | | | |
|---|---|---|---|---|---|
| 3,889,380 | A | * | 6/1975 | Albertazzi | 209/600 |
| 4,052,793 | A | * | 10/1977 | Coughlin et al. | 33/645 |
| 4,412,385 | A | * | 11/1983 | Selleri | 33/542 |
| 4,672,750 | A | * | 6/1987 | Storace et al. | 33/199 R |
| 5,259,121 | A | * | 11/1993 | Possati et al. | 33/542 |
| 5,822,877 | A | * | 10/1998 | Dai | 33/560 |
| 7,679,379 | B2 | * | 3/2010 | Zhang et al. | 324/693 |
| 2007/0175060 | A1 | * | 8/2007 | Idei et al. | 33/710 |
| 2009/0235547 | A1 | * | 9/2009 | Hellier | 33/503 |

FOREIGN PATENT DOCUMENTS

| | | |
|---|---|---|
| JP | 4-34611 U | 3/1992 |
| JP | 4-43205 U | 4/1992 |
| JP | 8-155794 A | 6/1996 |
| JP | 9-318307 A | 12/1997 |
| JP | 2007-78651 A | 3/2007 |

OTHER PUBLICATIONS

International Search Report for PCT/JP2011/075752, mailing date of Jan. 31, 2012.

English Translation of Written Opinion of the ISA dated Jan. 31, 2012, in corresponding International Application No. PCT/JP2011/075752. (5 pages).

* cited by examiner

HOLE EXAMINING DEVICE

FIELD

The present invention relates to a hole examining device that examines the size of a hole formed on a tube supporting plate, and the like in order to support a heat transfer tube in a steam generator used as a heat exchanger in a nuclear power plant.

BACKGROUND

For example, in a pressurized water reactor (PWR), light water is used as a reactor coolant and a neutron moderator, high-temperature and high-pressure water which is not boiled throughout a core is sent to a steam generator to generate steam by heat exchange, and the steam is sent to a turbine power generator to generate power. In addition, the pressurized water reactor transfers heat at high-temperature and high-pressure primary cooling water to secondary cooling water by using the steam generator and generates steam in the secondary cooling water. In the steam generator, primary cooling water flows in a plurality of thin heat transfer tubes, heat is transferred to the secondary cooling water that flows outside to generate the steam, and a turbine is actuated by the steam to generate power.

In the steam generator, in a body having a hollow sealing shape, a tube bundle shroud is arranged with a predetermined distance from an inner wall surface, a plurality of heat transfer tubes having an inverse U shape are arranged in the tube bundle shroud, an end portion of each heat transfer tube is supported on a tube sheet, and an inlet bowl and an outlet bowl of the primary cooling water are formed at a lower end portion of a body. Further, in the body, an inlet of the secondary cooling water positioned at an upper side of the tube bundle shroud is installed in the body, a steam-water separator and a moisture separator are vertically arranged in parallel, and a steam outlet is installed at an upper side thereof.

Therefore, the primary cooling water is supplied to the plurality of heat transfer tubes from a cooling water pipe through the inlet bowl, while the secondary cooling water is supplied into the body from the inlet. Then, heat exchange is performed between the primary cooling water that flows in the plurality of heat transfer tubes and the secondary cooling water (cooled water) that is circulated in the body, and as a result, the secondary cooling water absorbs heat to generate the steam. In addition, moisture is removed from the generated steam by the steam-water separator, and the steam of which the moisture is removed by the moisture separator is discharged from a steam outlet, while the primary cooling water in which heat exchange is terminated is discharged from the outlet bowl.

In the steam generator, the plurality of heat transfer tubes installed in the body is supported by the plurality of tube supporting plates. In the tube supporting plates, the heat transfer tubes are inserted into a plurality of holes, and as a result, the plurality of heat transfer tubes is supported so as not to vibrate. In this case, the holes of the tube supporting plates are formed by performing a cutting process using a predetermined processing device, but thereafter, whether positions or inner-diameter sizes of the holes are appropriate needs to be examined.

CITATION LIST

Patent Literature

Patent Literature 1: Japanese Patent Application Laid-open No. 09-318307

Patent Literature 2: Japanese Patent Application Laid-open No. 08-155794

SUMMARY

Technical Problem

When an inner diameter of a hole formed on a tube supporting plate is examined, a worker performs examination by using a gauge in the related art, but workability is not good because a plurality of holes are formed on one tube supporting plate. Further, in an inner-diameter displacement measuring device of Patent Literature 1, a guide holder is inserted into a heat transfer tube and a displacement of the inner diameter is measured according to a movement amount of a sensor holder. In a contactless inner-diameter measurement device of Patent Literature 2, an air micrometer or an electrostatic voltage meter is mounted on a measurement head as a probe and the air micrometer injects air into the hole, and the inner-diameter measurement device examines whether an inner-diameter size of the hole is within a predetermined size range based on the flow rate of the air. Even in any case, a long time is required in order to examine a plurality of holes, and as a result, workability is not good.

The present invention is contrived to solve the problem and an object of the present invention is to provide a hole examining device capable of improving workability of an examining operation.

Solution to Problem

According to an aspect of the present invention, a hole examining device includes: a moving body supported to be movable in two directions which cross each other; a measurement head supported to be movable in a direction crossing a movement direction of the moving body with respect to the moving body; a measurement head moving device capable of moving the measurement head with respect to the moving body; a plurality of measurers supported to be movable in the same direction as a movement direction of the measurement head with respect to the measurement head; and a measurer holding mechanism capable of holding the measurer at an advance position which advances as well as retreats.

Therefore, when a plurality of measurers is close to an examined member together with a measurement head, the measurer is inserted into a hole at an advance position or the measurer retreats without being inserted into the hole by contacting the periphery of the hole, and as a result, whether the hole is good or bad may be determined. Furthermore, since examination of a plurality of hole may be performed simultaneously, an examination time is shortened or a burden of a worker is reduced, thereby improving workability of an examining operation.

Advantageously, in the hole examining device, the measurer is movable to a first measurement position inserted into a hole of an examined member and movable to a second measurement position that retreats by contacting an examined object when the measurement head advances by the measurement head moving device.

Therefore, a first measurement position where the measurer is inserted into the hole and a second measurement position where the measurer retreats without being inserted into the hole by contacting the periphery of the hole are detected to appropriately determine whether the hole is good or bad.

Advantageously, in the hole examining device, the measurer includes a first measurer insertable when the hole formed in the examined member is larger than a minimum tolerance and a second measurer which is not inserted when the hole formed in the examined member is smaller than a maximum tolerance.

Therefore, when a first measurer is insertable into a hole larger than a minimum tolerance and further, when a second measurer is not inserted into a hole smaller than a maximum tolerance, it can be determined that the hole is good.

Advantageously, in the hole examining device, the first measurer and the second measurer are close to each other with a predetermined interval and further, are arranged in plural in a movement direction of the moving body at a regular interval, respectively.

Therefore, by arranging a plurality of first measurers and second measurers in parallel, the plurality of hole examinations can be performed simultaneously, and the same hole examination can be consecutively performed, and as a result, examining operation efficiency can be improved.

Advantageously, in the hole examining device, a position detector detecting a movement position of the measurer with respect to the measurement head and a determination device determining whether the hole of the examined member is good or bad based on a detection result of the position detector are installed.

Therefore, by determining whether a hole of an examined member is good or bad is determined based on a movement position of the measurer, whether an appropriate hole is good or bad can be determined by a simple configuration.

Advantageously, in the hole examining device, a moving body moving device moving the moving body, a positional detector detecting a movement position of the moving body, and a control device controlling the moving body moving device based on a detection result of the position detector are installed, and the control device moves the moving body every one unit by setting a distance corresponding to the number of the measurers in an arrangement direction of the measurer as one unit, and the measurer which is positioned at an end of the arrangement direction moves to face a hole formed at an end of the examined member.

Therefore, when the number of one line of holes in the examined member is the same as or a multiple of the measurers arranged in the measurement head, a measurer at an end portion moves to face a hole at an end portion of the examined member to perform examination, and as a result, examination of the total number of holes can be easily performed regardless of the number of one line of holes in the examined member.

Advantageous Effects of Invention

According to the hole examining device of the present invention, since a measurement head is supported to be movable to the moving body and a plurality of measurers can be held in the measurement head at an advance position which advances as well as retreats, hole examination is efficiently performed by the plurality of measurers to thereby improving workability of an examining operation.

BRIEF DESCRIPTION OF DRAWINGS

FIG. 6-1 is a schematic diagram illustrating an examination method by a first examiner in the hole examining device according to the embodiment.

FIG. 6-2 is a schematic diagram illustrating an examination method by a second examiner in the hole examining device according to the embodiment.

DESCRIPTION OF EMBODIMENTS

Hereinafter, embodiments of a hole examining device of the present invention will be described in detail with reference to the accompanying drawings. Further, the present invention is not limited to the embodiments.

Figure 1:
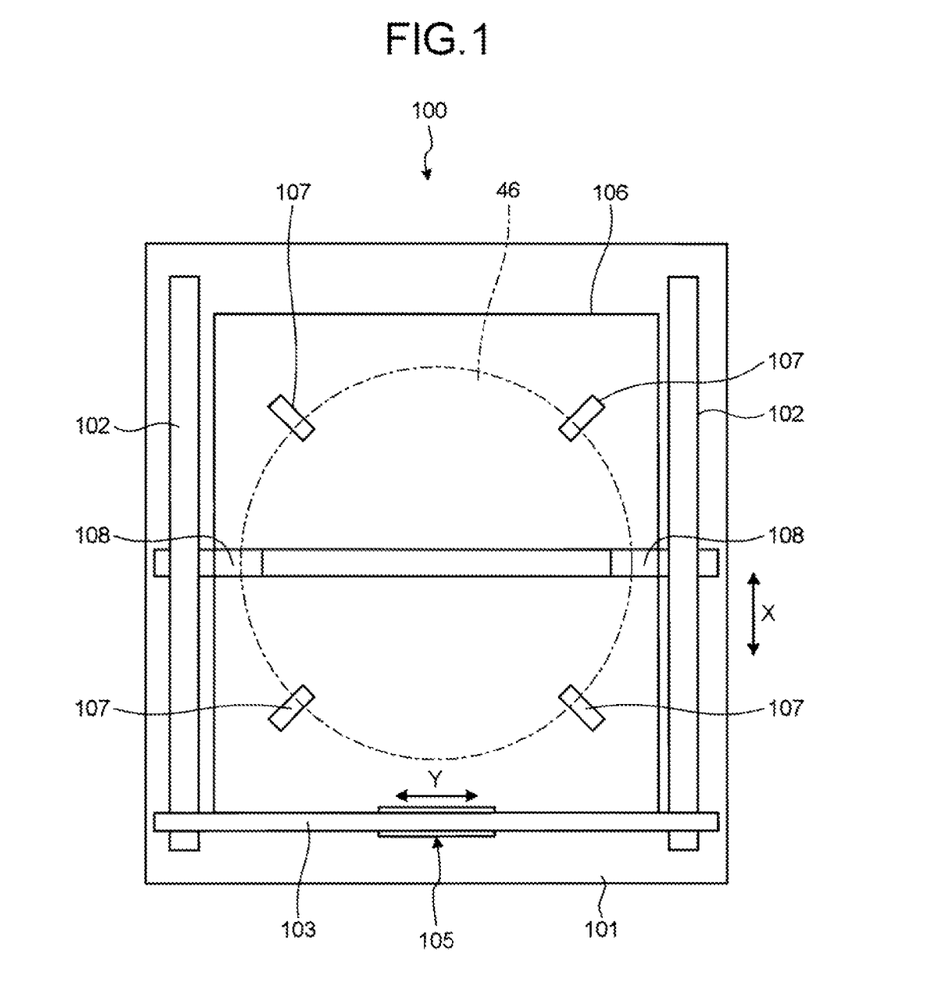
FIG. 1 is a plan view illustrating a hole examining device according to an embodiment of the present invention.
Figure 2:
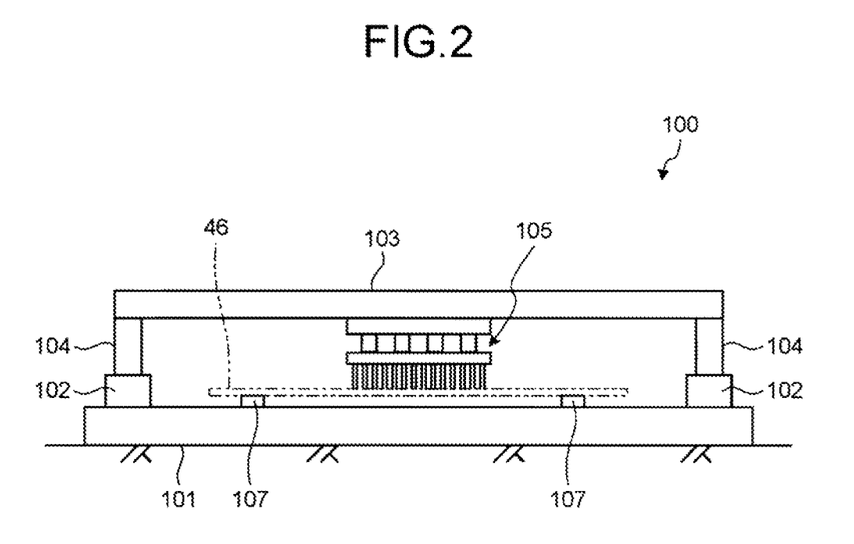
FIG. 2 is a front view illustrating the hole examining device according to the embodiment.
Figure 3:
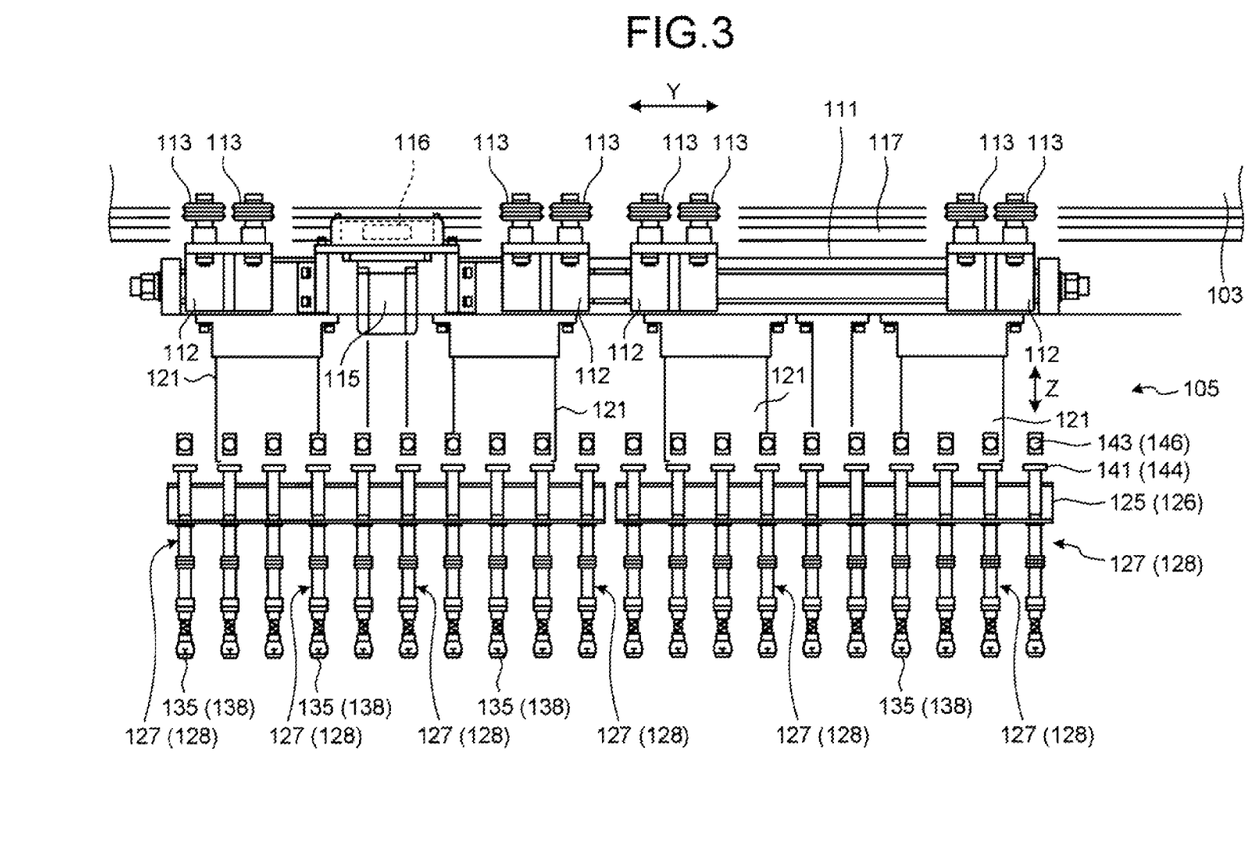
FIG. 3 is a front view illustrating an examination head in the hole examining device according to the embodiment.
Figure 4:
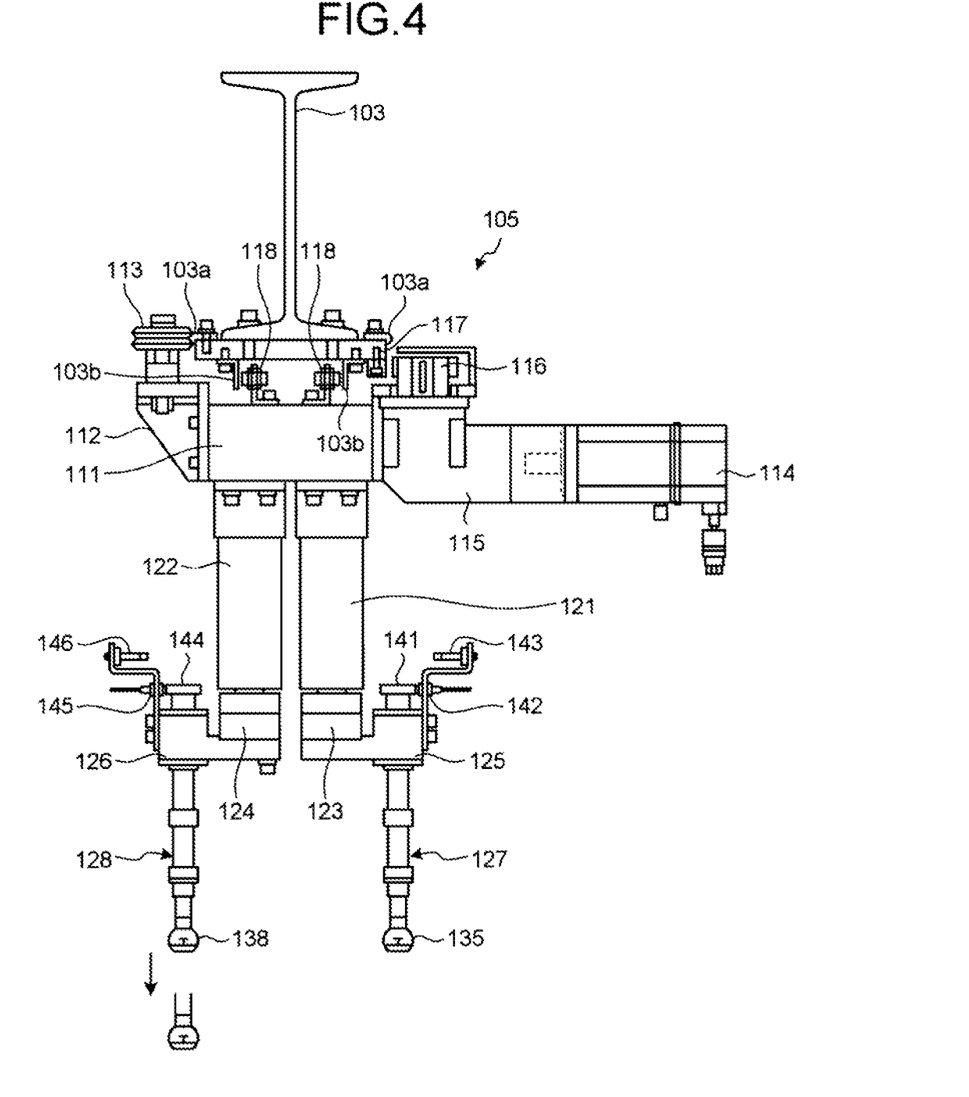
FIG. 4 is a left side view of the examination head in the hole examining device.
Figure 5:
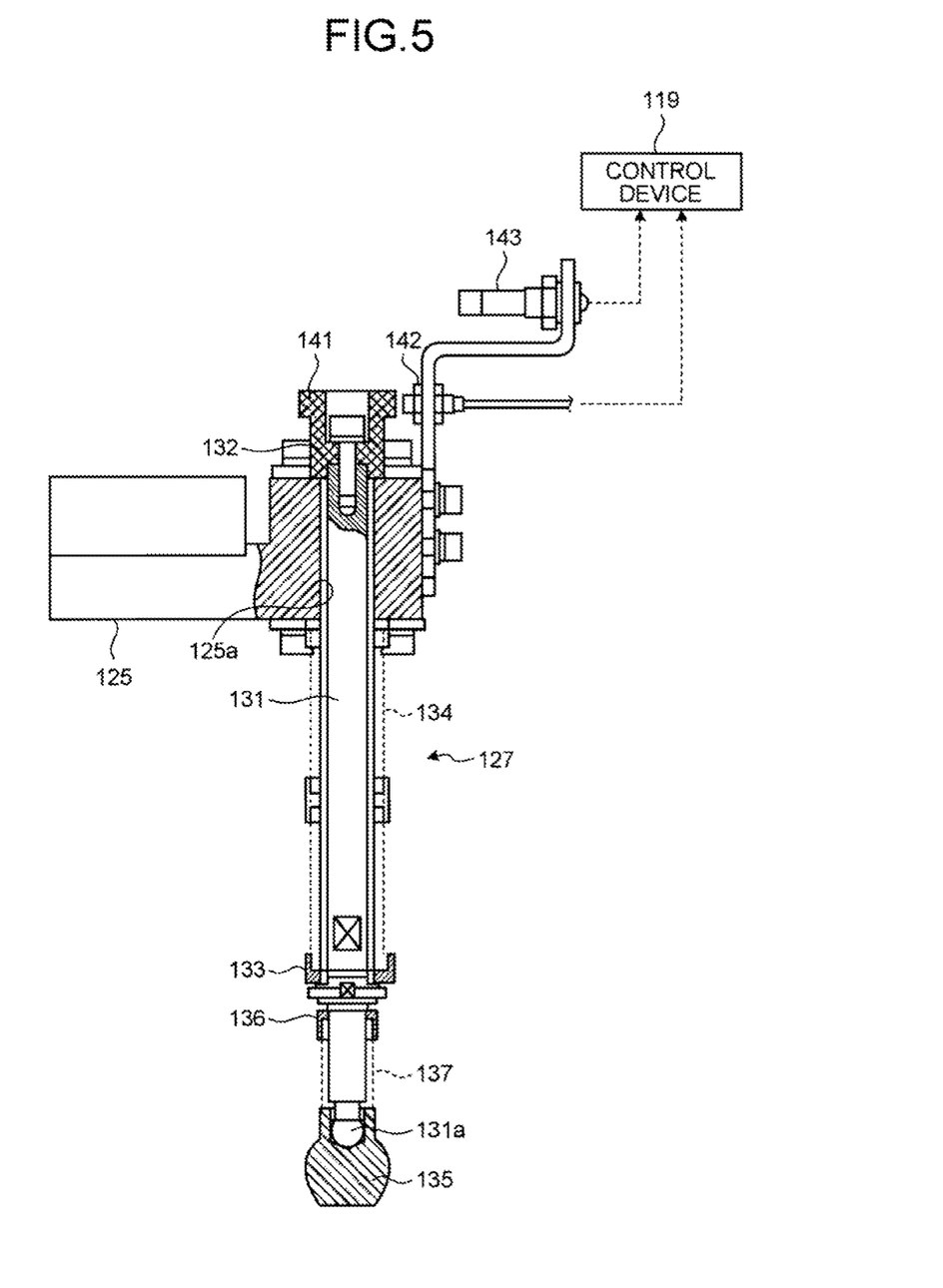
FIG. 5 is a front view illustrating a measurer in the examination head.
Figure 7:
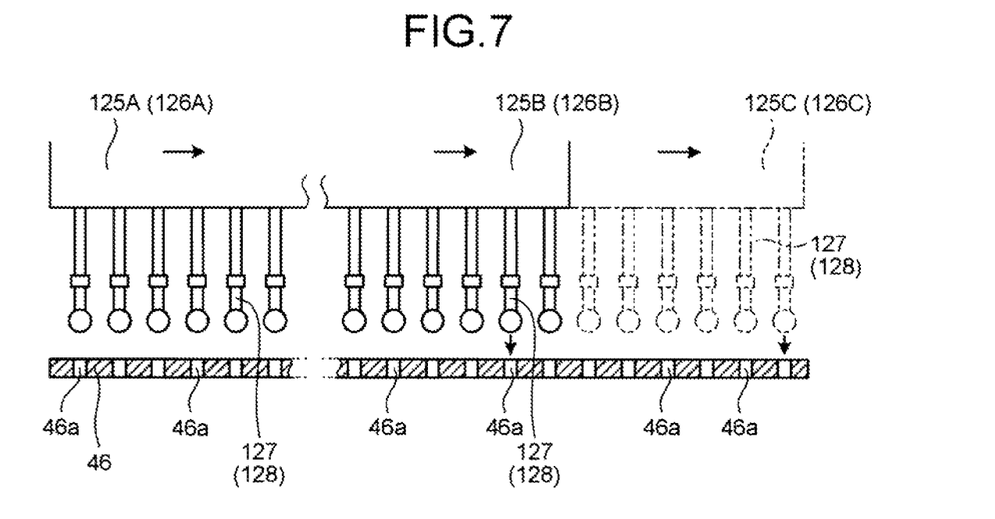
FIG. 7 is a schematic diagram illustrating a movement method of the examination head in the hole examining device according to the embodiment.
Figure 8:
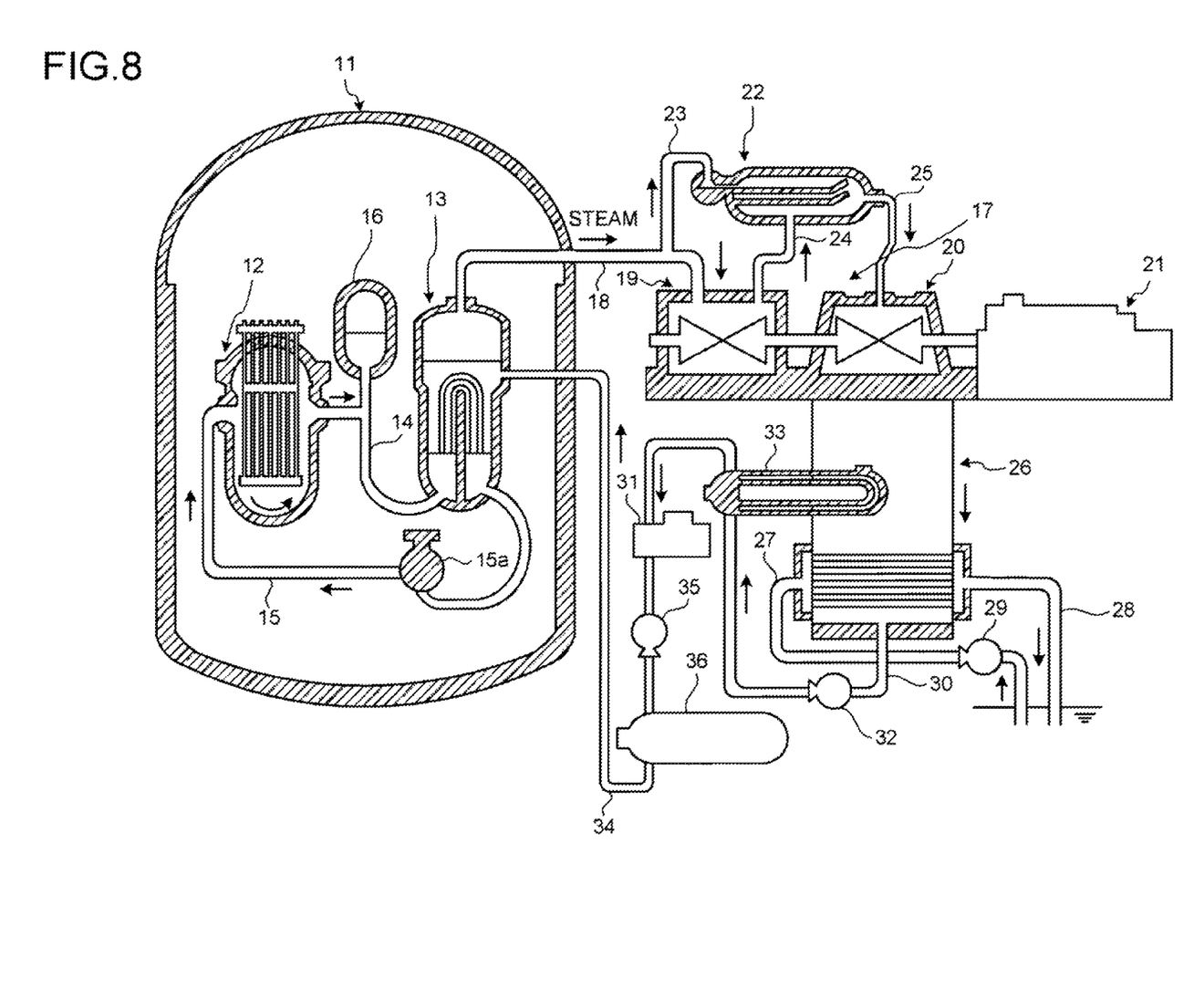
FIG. 8 is a schematic configuration diagram of a nuclear power generating plant adopting a steam generator according to the embodiment.
Figure 9:
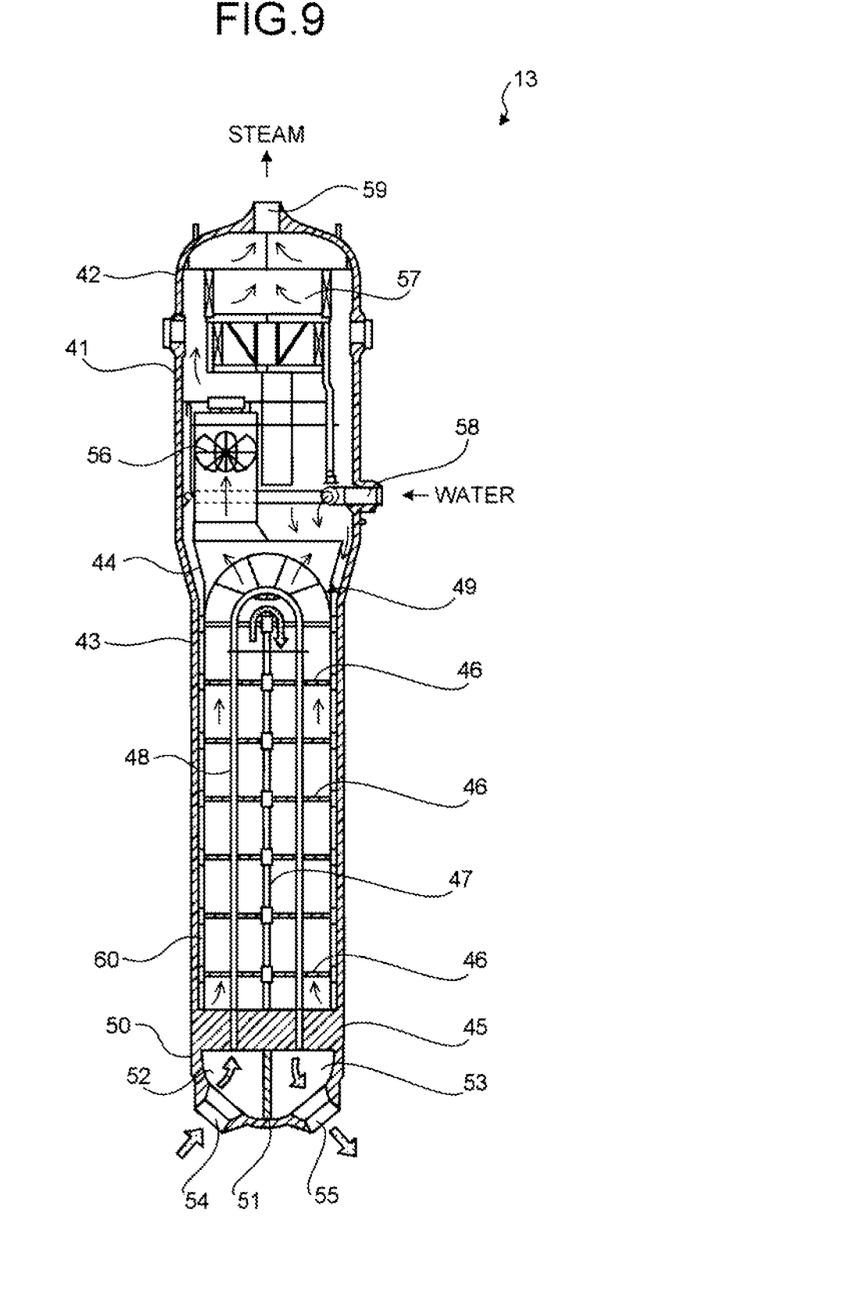
FIG. 9 is a schematic configuration diagram illustrating the steam generator according to the embodiment.

FIG. 1 is a plan view illustrating a hole examining device according to an embodiment of the present invention. FIG. 2 is a front view illustrating the hole examining device according to the embodiment. FIG. 3 is a front view illustrating an examination head in the hole examining device according to the embodiment. FIG. 4 is a left side view of the examination head in the hole examining device. FIG. 5 is a front view illustrating a measurer in the examination head. FIG. 6 is a schematic diagram illustrating an examination method by the hole examining device according to the embodiment. FIG. 7 is a schematic diagram illustrating a movement method of the examination head in the hole examining device according to the embodiment. FIG. 8 is a schematic configuration diagram of a nuclear power generating plant adopting a steam generator according to the embodiment. FIG. 9 is a schematic configuration diagram illustrating the steam generator according to the embodiment.

A nuclear reactor of an embodiment is a pressurized water reactor (PWR) that uses light water as reactor coolant and a neutron moderator, sends high-temperature and high-pressure water which is not boiled throughout a core to a steam generator to generate steam by heat exchange, and sends the steam to a turbine power generator to generate power.

In a nuclear power generating plant having the pressurized water reactor of the embodiment, a pressurized water reactor 12 and a steam generator 13 are contained in a containment 11, the pressurized water reactor 12 and the steam generator 13 are connected through cooling water pipes 14 and 15, a pressurizer 16 is installed on the cooling water pipe 14, and a cooling water pump 15a is installed on the cooling water pipe 15, as illustrated in FIG. 8. In this case, the light water is used as a moderator and primary cooling water (coolant), and a primary cooling system is controlled to maintain a high-pressure state of approximately 150 to 160 atmospheric pressure by the pressurizer 16 in order to suppress boiling of the primary cooling water in a reactor core. Therefore, in the pressurized water reactor 12, the light water is heated as the primary cooling water by low-enrichment uranium or MOX as fuel (nuclear fuel), and high-temperature primary cooling water is sent to the steam generator 13 through the cooling water pipe 14 while the high-temperature primary cooling water is maintained at predetermined high pressure by the pressurizer 16. In the steam generator 13, heat exchange is performed between the high pressure and high temperature primary cooling water and the second cooling water, and cooled primary cooling water is returned to the pressurized water reactor 12 through the cooling water pipe 15.

The steam generator 13 is connected with a steam turbine 17 through a cooling water pipe 18, and the steam turbine 17 is connected with a power generator 21 simultaneously with a high-pressure turbine 19 and a low-pressure turbine 20. Further, a moisture separation heater 22 is installed between the high-pressure turbine 19 and the low-pressure turbine 20, and a cooling water branching pipe 23 branched from the cooling water pipe 18 is connected to the moisture separation heater 22, while the high-pressure turbine 19 and the moisture separation heater 22 are connected with each other by a low-temperature reheat pipe 24, and the moisture separation heater 22 and the low-pressure turbine 20 are connected with each other by a high-temperature reheat pipe 25.

In addition, the low-pressure turbine 20 of the steam turbine 17 has a condenser 26, and an intake pipe 27 and a drain pipe 28 that supplies and drains the cooling water (for example, sea water) are connected to the condenser 26. The intake pipe 27 has a circulation water pump 29, and the other end portion is disposed in the sea together with the drain pipe 28. In addition, the condenser 26 is connected to a deaerator 31 through a cooling water pipe 30, and a condensing pump 32 and a low-pressure water supply heater 33 are installed on the cooling water pipe 30. Further, the deaerator 31 is connected to the steam generator 13 through a cooling water pipe 34, and a water supply pump 35 and a high-pressure water supply heater 36 are installed on the cooling water pipe 34.

Therefore, in the steam generator 13, steam generated by exchanging heat with the high-pressure and high-temperature primary cooling water is sent to the steam turbine 17 (to the low-pressure turbine 20 from the high-pressure turbine 19) through the cooling water pipe 18, and the steam turbine 17 is driven by the steam, and as a result, power is generated by the power generator 21. In this case, the steam from the steam generator 13 drives the high-pressure turbine 19 and thereafter, after moisture contained in the steam is removed and heated by the moisture separation heater 22, the low-pressure turbine 20 is driven. In addition, the steam driving the steam turbine 17 is cooled by using the sea water in the condenser 26 to become condensed water, heated by, for example, low-pressure steam extracted from the low-pressure turbine 20 in the low-pressure water supply heater 33, heated by, for example, the high-pressure steam extracted from the high-pressure turbine 19 in the high-pressure water supply heater 36 after impurities such as dissolved oxygen or uncondensed gas (ammonia gas) are removed in the deaerator 31, and thereafter returned to the steam generator 13.

In the steam generator 13 adopted in the nuclear power generating plant configured as above, as illustrated in FIG. 9, a body 41 has a sealed hollow cylindrical shape, in which a diameter of an upper part is slightly smaller than that of a lower part. The body 41 is configured by joining an upper body 42 and a lower body 43 through welding. In the lower body 43 in the body 41, a tube group external cylinder 44 having a cylindrical shape, which is spaced apart from an inner wall surface of the lower body 43 with a predetermined distance is arranged, in which a lower end portion is extended up to the vicinity of a tube sheet 45.

A plurality of tube supporting plates 46 is arranged in the tube group external cylinder 44 to correspond to a predetermined height position therein and supported by a plurality of stay rods 47 that is extended upward from the tube sheet 45. In addition, in the tube group external cylinder 44, a heat transfer tube group 49 which is constituted by a plurality of heat transfer tubes 48 having an inverse U shape is disposed therein, and an end portion of each heat transfer tube 48 is expanded and supported onto the tube sheet 45, and a middle portion is supported by the plurality of tube supporting plates 46. In this case, in the tube supporting plate 46, a plurality of through-holes (not illustrated) is formed, and each heat transfer tube 48 is inserted and supported in the through-hole.

In the lower body 43, a bowl 50 is fixed to a lower end portion, an inner part is partitioned by an inlet chamber 52 and an outlet chamber 53 by a partition 51, an inlet nozzle 54 and an outlet nozzle 55 are formed, one end portion of each heat transfer tube 48 is in communication with the inlet chamber 52, and the other end portion is in communication with the outlet chamber 53. Further, the cooling water pipe 14 is connected to the inlet nozzle 54, while the cooling water pipe 15 is connected to the outlet nozzle 55.

In the upper body 42, a steam-water separator 56 that separates supply water into steam and heat water and a moisture separator 57 that removes moisture of the separated steam, which becomes a state close to dry steam, are installed therein. Further, in the upper body 42, a water supply tube 58 that supplies the secondary cooling water into the body 41 is inserted between the heat transfer tube group 49 and the steam-water separator 56, while a steam outlet 59 is formed in a ceiling part. In addition, in the body 41, when the secondary cooling water supplied into the body 41 flows down between the body 41 and the tube group external cylinder 44 from the water supply tube 58 to be circulated upward from the tube sheet 45, and moves up in the heat transfer tube group 49, a water supply path 60 that exchanges heat with heat water (primary cooling water) that flows in each heat transfer tube 48 is installed. Furthermore, the cooling water pipe 34 is connected to the water supply tube 58, while the cooling water pipe 18 is connected to the steam outlet 59.

Therefore, the primary cooling water heated in the pressurized water reactor 12 is sent to the inlet chamber 52 of the steam generator 13 through the cooling water pipe 14 and is circulated by passing through the plurality of heat transfer tubes 48 to reach the outlet chamber 53. Meanwhile, the secondary cooling water cooled in the condenser 19 is sent to the water supply tube 58 of the steam generator 13 through the cooling water pipe 21, and exchanges heat with the heat water (primary cooling water) that flows in the heat transfer tube 48 by passing through the water supply path 60 in the body 41. That is, in the body 41, heat exchange is performed between the high-pressure and high-temperature primary cooling water and the secondary cooling water, and the cooled primary cooling water is returned to the pressurized water reactor 12 from the outlet chamber 53 through the cooling water pipe 15. Meanwhile, the secondary cooling water which exchanges heat with the high-pressure and high-temperature primary cooling water moves up in the body 41 and thus, is separated into steam and heat water in the steam-water separator 56, and the moisture of the steam is removed from the moisture separator 57 and thereafter, is sent to the steam turbine 17 through the cooling water pipe 18.

In the body 41 of the steam generator 13 configured as above, the plurality of tube supporting plates 46 is arranged at a predetermined interval therein, and the tube sheet 45 is installed in a lower part thereof, and the plurality of heat transfer tubes 48 constituting the heat transfer tube group 49 is supported by penetrating the through-holes formed on each tube supporting plate 46 and the tube sheet 45. The through-holes do not have a circular shape but a shape (for example, a three-leaf shape when the number of cutouts is three) having one or more cutouts around a circle. That is, the heat transfer tube 48 fits in the through-hole of the tube supporting plate 46 to support the heat transfer tube 48, and the generated steam needs to move upward from the tube supporting plates 46.

The hole examining device of the embodiment examines the plurality of through-holes formed on the tube supporting plates 46, and in detail, determines whether an inner diameter of each through-hole of the tube supporting plate 46 is within a set tolerance. Herein, because the through-hole does not have the circular shape as described above, the inner diameter of the through-hole to be described below is a diameter of the inside of a portion that supports an outer diameter of the heat transfer tube 48 that penetrates the through-hole.

In the embodiment, as illustrated in FIGS. 1 and 2, in a hole examining device 100, a supporter 101 having an appropriate size is installed at a predetermined position, and a pair of left and right first traveling rails 102 are installed on the supporter 101. A second traveling rail 103 is disposed over the left and right first traveling rails 102, and each end portion is supported to be movable on the first traveling rail 102 through each leg portion 104. In addition, an examination head 105 is suspended and supported on the second traveling rail 103 to be movable. In this case, in the second traveling rail 103, a driving device (not illustrated) is received in each leg portion 104 and is movable with respect to the first traveling rail 102.

In this case, the pair of left and right first traveling rails 102 are disposed in an X direction, the second traveling rail 103 is disposed in a Y direction which is orthogonal to (crosses) a horizontal direction to the X direction, and the examination head 105 is supported to be movable in two directions of the X direction and the Y direction which cross each other.

Further, an examination table 106 is installed on the supporter 101 between the left and right first traveling rails 102. In the examination table 106, four supporting blocks 107 on which the tube supporting plate (examined member) 46 having a discal shape may be placed and two engaging blocks 108 capable of engaging an outer periphery of the tube supporting plate (examined member) 46 are installed.

In the examination head 105, as illustrated in FIGS. 3 to 5, a moving block (moving body) 111 having a box shape is disposed below the second traveling rail 103, and support rollers 113 are mounted on both left and right sides in a moving direction through a bracket 112 having a shape of a plurality of L letters, respectively. Each support roller 113 fits in a rail portion 103a formed at both sides of the second traveling rail 103 and is rollable. Further, in FIG. 4, only one of the bracket 112 and the support roller 113 is illustrated.

Further, in the moving block 111, a driving device 115 having a driving motor 114 is mounted on the side thereof, and a pinion gear 116 that is driven and rotated by the driving motor 114 engages with a rack gear 117 fixed on the side of the second traveling rail 103. Therefore, the moving block 111 may move in a longitudinal direction (Y direction) of the second traveling rail 103 from the driving device 115. In addition, in the moving block 111, a positional sensor (position detector) 118 is installed in an upper part thereof, and the positional sensor 118 detects a detection piece 103b fixed to the bottom of the second traveling rail 103 to detect a movement position of the moving block 111, and a control device 119 controls the driving device 115 based on the detection result.

A plurality of (four in the embodiment) two kinds of air cylinders (measurement head moving devices) 121 and 122 are arranged in two lines in the movement direction of the moving block 111 in a lower side of the moving block 111, and a base end section (upper end portion) is fixed to a lower part of the moving block 111. That is, a first air cylinder 121 is positioned in a front line in FIG. 3 (a right line in FIG. 4) and is installed in the movement direction of the moving block 111. Meanwhile, a second air cylinder 122 is positioned in a rear line in FIG. 3 (a left line in FIG. 4) and is installed in the movement direction of the moving block 111. The respective air cylinders 121 and 122 are disposed at positions opposed to each other.

The air cylinders 121 and 122 have driving rods 123 and 124 that are stretchable downward (vertically extendable), respectively and measurement heads 125 and 126 are connected to front end portions of the driving rods 123 and 124, respectively. Therefore, the driving rods 123 and 124 are extended by the air cylinders 121 and 122, respectively to be movable each of the measurement heads 125 and 126 in a vertical direction, that is, a Z direction crossing the movement direction (the X direction and the Y direction) of the moving block 111.

In a first measurement head 125, a plurality of (twenty in the embodiment) first measurers 127 are arranged in a straight line form at a regular interval in the longitudinal direction of the moving block 111. Meanwhile, in a second measurement head 126, a plurality of (twenty in the embodiment) second measurers 128 are arranged in a straight line form at a regular interval in the longitudinal direction of the moving block 111. The respective measurement heads 125 and 126 are disposed at positions opposed to each other. Each of the measurers 127 and 128 is a sphere gauge of which an outer peripheral surface has a spherical shape.

In addition, in the first measurer 127, a measurer body 131 has a bar shape, fits in a support hole 125a is formed the first measurement head 125, and is movable in the longitudinal direction, that is, the same Z direction as the first measurement head 125. In the measurer body 131, an engaging block 132 is fixed to a base end section (top section) that protrudes upward from the first measurement head 125, while a support flange 133 is fixed to a front end portion that protrudes downward from the first measurement head 125, and a compression coil spring 134 is disposed on the periphery of the measurer body 131 and interposed between the first measurement head 125 and the support flange 133. Further, in the measurer body 131, an examination body 135 is mounted on a sphere supporting portion 131a of a front end to be movable in a sphere support direction, that is, a 3D direction, and a compression coil spring 137 is interposed between support flanges 136 fixed to a lower side by the support flange 133 in the measurer body 131.

In this case, a measurer holding mechanism of the present invention is configured by the engaging block 132 or the compression coil spring 134.

Figure 61:
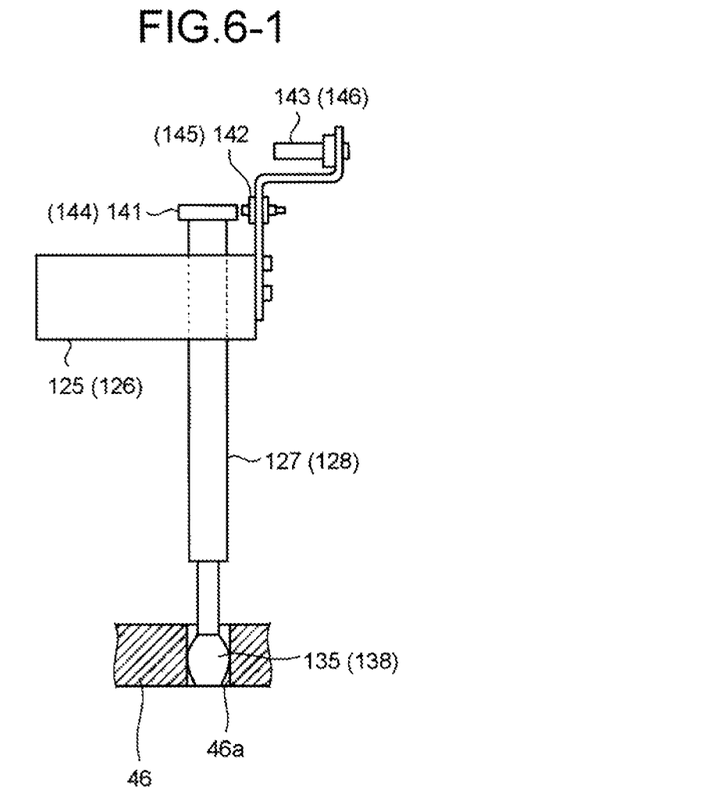
Figure 62:
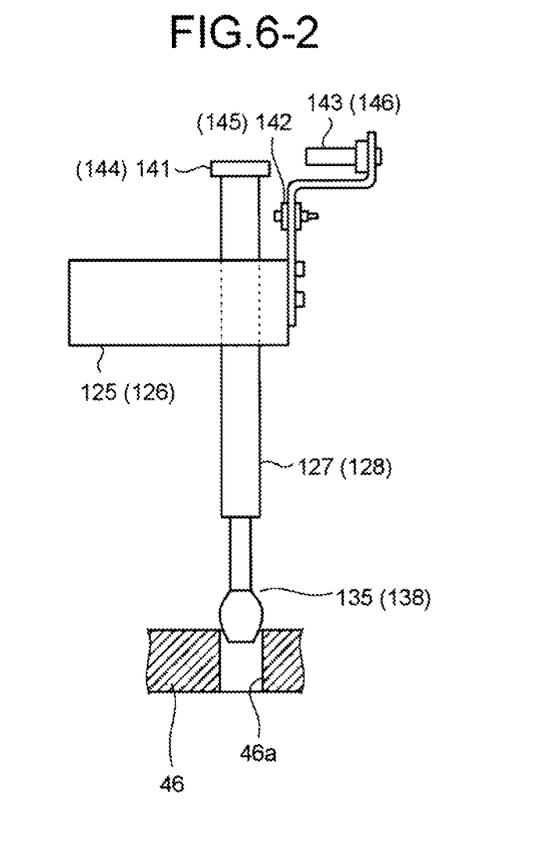

Therefore, the first measurer 127 is biased downward by biasing force of the compression coil spring 134, and the engaging block 132 is positioned and supported at an advance position contacting the top of the first measurement head 125. In the first measurer 127, as illustrated in FIG. 6-1, the examination body 135 may be inserted into a through-hole 46a of the tube supporting plate 46, but as illustrated in FIG. 6-2, when the examination body 135 is disabled to be inserted into the through-hole 46a of the tube supporting plate 46, the first measurer 127 is resistant to the biasing force of the compression coil spring 134 to move to an upper retreating position. Further, the examination body 135 is spherically supported and further, biasing-supported at a predetermined measurement position by the compression coil spring 137, and when the examination body 135 is inserted into the through-hole 46a of the tube supporting plate 46, the examination body 135 moves in an X-Y plane to absorb various errors.

Meanwhile, because the second measurer 128 has the substantially same configuration as the first measurer 127, a detailed description thereof will be omitted. However, the first measurer 127 and the second measurer 128 are different from each other in outer-diameter sizes of the examination bodies 135 and 138. That is, in each through-hole 46a formed in the tube supporting plate 46, a size tolerance is set in designing, and in the case of the size tolerance, a minimum tolerance and a maximum tolerance are set with a prescribed design value. As a result, in the first measurer 127, the outer-diameter size of the examination body 135 becomes an insertable size when an inner diameter of the through-hole 46a of the tube supporting plate 46 is larger than the minimum tolerance, that is, a value acquired by subtracting the minimum tolerance from the design value. Meanwhile, in the second measurer 128, the outer-diameter size of the examination body 138 becomes an insertion-impossible size when an inner diameter of the through-hole 46a of the tube supporting plate 46 is smaller than the maximum tolerance, that is, a value acquired by adding the maximum tolerance to the design value.

That is, when the examination body 135 of the second measurer 128 may not be inserted into the through-hole 46a of the tube supporting plate 46 while the examination body 135 of the first measurer 127 may be inserted into the through-hole 46a of the tube supporting plate 46, it is considered that the through-hole 46a of the tube supporting plate 46 is within the size tolerance with respect to the design value, and as a result, the examination body 135 is determined as a good product. Meanwhile, when the examination body 135 of the first measurer 127 may not be inserted into the through-hole 46a of the tube supporting plate 46 or the examination body 135 of the second measurer 128 may be inserted into the through-hole 46a of the tube supporting plate 46, it is considered that the through-hole 46a of the tube supporting plate 46 is not within the size tolerance with respect to the design value, and as a result, the examination body 135 is determined as a bad product.

As a result, in the first measurement head 125, two positional sensors (positional detectors) 142 and 143 that detect a detection flange 141 formed on the top of the first measurer 127 are installed. The first positional sensor 142 detects the detection flange 141 when the first measurer 127 is at an advance position, and the second positional sensor 143 detects the detection flange 141 when the first measurer 127 is at a retreat position. Similarly, in the second measurement head 126, two positional sensors (positional detectors) 145 and 146 that detect a detection flange 144 formed on the top of the second measurer 128 are installed. The first positional sensor 145 detects the detection flange 144 when the second measurer 128 is at the advance position, and the second positional sensor 146 detects the detection flange 144 when the second measurer 128 is at the retreat position.

Therefore, a control device (determination device) 119 determines whether the through-hole 46a of the tube supporting plate 46 is good or bad based on the detection results of the respective positional sensors 142, 143, 145, and 146. In more detail, as illustrated in FIG. 6-1, in the first measurement head 125, when the first measurement head 125 moves down (advances) by the first air cylinder 121 and the first measurer 127 also moves down (advances), the first measurer 127 moves to a first measurement position in the case where the examination body 135 is inserted into the through-hole 46a of the tube supporting plate 46. In this case, because the first positional sensor 142 detects the detection flange 141, but the second positional sensor 143 does not detect the detection flange 141, the control device 119 detects that the first measurer 127 moves to the first measurement position. Meanwhile, as illustrated in FIG. 6-2, when the first measurer 127 moves down (advances) and the examination body 135 may not be inserted into the through-hole 46a of the tube supporting plate 46, the first measurer 127 retreats to move to a second measurement position. In this case, because the first positional sensor 142 does not detect the detection flange 141, but the second positional sensor 143 detects the detection flange 141, the control device 119 detects that the first measurer 127 moves to the second measurement position.

Further, as illustrated in FIG. 6-1, in the second measurement head 126, the second measurement head 126 moves down (advances) by the second air cylinder 122, and when the second measurer 128 also moves down (advances) similarly, the second measurer 128 moves to the first measurement position in the case where the examination body 138 is inserted into the through-hole 46a of the tube supporting plate 46. In this case, because the first positional sensor 145 detects the detection flange 144, but the second positional sensor 146 does not detect the detection flange 144, the control device 119 detects that the second measurer 128 moves to the first measurement position. Meanwhile, as illustrated in FIG. 6-2, similarly, the second measurer 128 moves down (advances) and when the examination body 138 may not be inserted into the through-hole 46a of the tube supporting plate 46, the second measurer 128 retreats to move to the second measurement position. In this case, because the first positional sensor 145 does not detect the detection flange 144, but the second positional sensor 146 detects the detection flange 144, the control device 119 detects that the second measurer 128 moves to the second measurement position.

When the control device 119 detects that the first measurer 127 moves to the first measurement position and detects that the second measurer 128 moves to the second measurement position, it is considered that the through-hole 46a of the tube supporting plate 46 is within the size tolerance, and as a result, the examination body 138 is determined as a good product. Meanwhile, when the control device 119 detects that the first measurer 127 moves to the second measurement position or detects that the second measurer 128 moves to the first measurement position, it is considered that the through-hole 46a of the tube supporting plate 46 is not within the size tolerance, and as a result, the examination body 138 is determined as a bad product.

Herein, an examination method of the through-hole 46a of the tube supporting plate 46 by the hole examining device 100 according to the embodiment will be described.

The tube supporting plate 46 has the discal shape, and the plurality of through-holes 46a are formed on a straight line at a predetermined interval and the through-holes 46a are formed in plural lines at a predetermined interval. The hole examining device 100 performs examination for the through-holes 46a of a predetermined line. In this case, as illustrated in FIG. 7, first, examination is performed toward the other end (a right side in FIG. 7) from one end (a left side in FIG. 7) with respect to the line of plurality of through-holes 46a.

That is, because the measurement heads 125 and 126 have twenty measurers 127 and 128, respectively, the examination head 105 of the hole examining device 100 performs examination for twenty through-holes 46a from one end (the left side in FIG. 7) with respect to one line of through-holes 46a formed on the tube supporting plate 46. As a result, the control device 119 first positions the measurers 127 and 128 at one end portion among respective twenty measurers 127 and 128 at the positions of respective measurement heads 125A and 126A by moving the examination head 105 to face the through-hole 46a at one end portion of an arrangement direction among the plurality of through-holes 46a of the predetermined line. In this case, the control device 119 allows twenty first measurers 127 to face the respective through-holes 46*a* and performs examination by moving down the first measurement head 125A as described above, and thereafter, allows twenty second measurers 128 to face the respective through-holes 46*a* and performs examination by moving down the second measurement head 126A as described above.

When the first examination is terminated, the control device 119 moves the examination head 105 as long as a distance corresponding to one unit in an arrangement direction of each of the measurers 127 and 128 while a distance corresponding to the number (twenty in the embodiment) of the measurers 127 and 128 is set as one unit. Then, the measurers 127 and 128 of the respective measurement heads 125 and 126 move to positions corresponding to through-holes 46*a* of which examination is not terminated by passing through through-holes 46*a* of which examination is terminated. In addition, the examination is performed at the positions similarly as described above. As such, the control device 119 performs examination by frequently moving the examination head 105 as long as the distance every one unit by setting the distance corresponding to the number of the measurers 127 and 128 as one unit.

In addition, last, when examination of the through-hole 46*a* is terminated at positions of measurement heads 125B and 126B, the number of the through-holes 46*a* which are not examined is six. In this case, when the control device 119 moves by setting the distance corresponding to the number of the measurers 127 and 128 as one unit, the measurers 127 and 128 move up to positions that do not face the through-holes 46*a*. As a result, in this case, the control device 119 positions the measurers 127 and 128 of the other end portion among each twenty measurers 127 and 128 at positions of respective measurement heads 125C and 126C by moving the examination head 105 to face the through-holes 46*a* at the other end portion in an arrangement direction. That is, some measurers 127 and 128 face the through-holes 46*a* of which examination has been already completed to prevent some measurers 127 and 128 from moving up to the positions not facing the through-holes 46*a*. When examination is performed at the positions similarly to be described above, the examination is performed twice with respect to some through-holes 46*a*. I this case, an examination result of the through-holes 46*a* which are duplicately examined may not be adopted.

When examination is terminated with respect to all through-holes 46*a* of a predetermined line, the same examination as above is performed with respect to through-holes 46*a* of an adjacent line.

As such, in the hole examining device of the embodiment, the examination head 105 is supported to be movable in the X direction and the Y direction which are orthogonal to each other, the measurement heads 125 an 126 are supported to be movable in the Z direction which is orthogonal to the X direction and the Y direction with respect to the examination head 105, and the plurality of first measurers 127 and the plurality of second measurers 128 are arranged in the measurement heads 125 and 126 in parallel and may be held at an advance position which advances as well as retreats with respect to the Z direction.

Accordingly, when the plurality of measurers 127 and 128 access the tube supporting plate 46 together with the measurement heads 125 and 126, the measures 127 and 128 are inserted into the through-hole 46*a* at the advance position, or the measurers 127 and 128 are not inserted into the through-holes 46*a* but retreat by contacting the peripheries of the through-holes 46*a* to determine whether the through-holes 46*a* are good or bad. Furthermore, the plurality of through-holes 46*a* may be examined simultaneously. Therefore, an examination time is shortened or a burden of a worker is reduced to improve workability of an examining operation.

Further, in the hole examining device of the embodiment, the measurement heads 125 and 126 advance by the air cylinders 121 and 122, and as a result, the measurers 127 and 128 are movable to the first measurement position inserted into the through-hole 46*a* of the tube supporting plate 46 and movable to the retreated second measurement position by contacting the tube supporting plate 46. Accordingly, the first measurement position where the measurers 127 and 128 are inserted into the through-holes 46*a* and the second measurement position where the measurers 127 and 128 retreat without being inserted into the through-holes 46*a* by contacting the peripheries of the through-hole 46*a* are determined, and as a result, whether the through-holes 46*a* are good or bad may be appropriately determined.

Further, in the hole examining device of the embodiment, the first measurer 127 which is insertable when the through-holes 46*a* formed on the tube supporting plate 46 is larger than the minimum tolerance and the second measurer 128 which is not inserted when the through-holes 46*a* formed on the tube supporting plate 46 is smaller than the maximum tolerance are installed. Therefore, when the first measurer 127 is insertable into the through-hole 46*a* which is larger than the minimum tolerance and further, when the second measurer 128 is not inserted into the through-hole 46*a* which is smaller than the maximum tolerance, it may be determined that the through-hole 46*a* is good.

Further, in the hole examining device of the embodiment, the first measurer 127 and the second measurer 128 are close to each other with a predetermined interval and further, the plurality of first measurers 127 and second measurers 128 are arranged at a regular interval in the movement direction of the moving block 111. Accordingly, the plurality of through-holes 46*a* may be examined simultaneously and the same through-hole 46*a* may be consecutively examined by arranging the plurality of first measurers 127 and second measurers 128 in parallel, thereby improving examining operation efficiency.

Further, in the hole examining device of the embodiment, the positional sensors 142, 143, 145, and 146 that detect movement positions of the measurers 127 and 128 for the measurement heads 125 and 126, and the control device 119 that determines whether the through-hole 46*a* of the tube supporting plate 46 is good or bad based on the detection results of the positional sensors 142, 143, 145, and 146 are installed. Therefore, by determining that the through-hole 46*a* of the tube supporting plate 46 is good or bad based on the movement positions of the measurers 127 and 128, it may be determined whether the appropriate through-hole 46*a* is good or bad by a simple configuration.

Further, in the hole examining device of the embodiment, the control device 119 may control the driving device 115 by detecting the movement position of the moving block 111 (the measurement heads 125 and 126) when the positional sensor 118 detects a detection piece 103*b* of a second traveling rail 103, and moves the measurers 127 and 128 formed at ends in an arrangement direction to face the through-holes 46*a* formed at ends of the tube supporting plates 46 while moving the measurement heads 125 and 126 by a distance every one unit in arrangement directions of the measurers 127 and 128 by using distances corresponding to the numbers of the measurers 127 and 128 as one unit, at the time of examining the through-hole 46*a* by using the examination head 105. Therefore, when the number of one line of through-holes 46*a* to the tube supporting plate 46 is not the same as or a multiple of the number of the measurers 127 and 128 arranged in the measurement heads 125 and 126, the measurers 127 and 128 at the end portion move to face the through-hole 46a at the end portion of the tube supporting plate 46 to perform examination, and as a result, examination of the total number of through-holes 46a may be easily performed regardless of the number of one line of through-holes 46a in the tube supporting plate 46.

In addition, in the embodiment, the number or the placement direction of the measurement heads 125 and 126 or the measurers 127 and 128 is not limited to two or twenty, but may be appropriately set according to the arrangement or the number of holes which are examined.

Further, in the embodiment, a hole for examining the examined member with the tube supporting plate 46 adopts the through-hole 46a, but a plurality of holes may be formed on a panel having a predetermined thickness, which may be applied to even any field.

INDUSTRIAL APPLICABILITY

The hole examining device according to the present invention may hold the plurality of measurers at the advance position which advances as well as retreats in the measurement head to improve the workability of the examining operation and be applied to all hole examining operations.

REFERENCE SIGNS LIST

11 CONTAINMENT
12 PRESSURIZED WATER REACTOR
13 STEAM GENERATOR
17 STEAM TURBINE
19 HIGH-PRESSURE TURBINE
20 LOW-PRESSURE TURBINE
21 POWER GENERATOR
41 BODY
45 TUBE SHEET
46 TUBE SUPPORTING PLATE (EXAMINED MEMBER)
46a THROUGH-HOLE (HOLE)
44 TUBE GROUP EXTERNAL CYLINDER
48 HEAT TRANSFER TUBE
49 HEAT TRANSFER TUBE GROUP
100 HOLE EXAMINING DEVICE
102 FIRST TRAVELING RAIL
103 SECOND TRAVELING RAIL
105 EXAMINATION HEAD
111 MOVING BLOCK (MOVING BODY)
115 DRIVING DEVICE (MOVING BODY MOVING DEVICE)
118 POSITIONAL SENSOR (POSITION DETECTOR)
119 CONTROL DEVICE (DETERMINATION DEVICE)
121 FIRST AIR CYLINDER (MEASUREMENT HEAD MOVING DEVICE)
122 SECOND AIR CYLINDER (MEASUREMENT HEAD MOVING DEVICE)
125 FIRST MEASUREMENT HEAD
126 SECOND MEASUREMENT HEAD
127 FIRST MEASURER
128 SECOND MEASURER
135,138 EXAMINATION BODY
142,145 FIRST POSITIONAL SENSOR
143,146 SECOND POSITIONAL SENSOR

The invention claimed is:

1. A hole examining device, comprising:
a moving body supported to be movable in two directions which cross each other;
a measurement head supported to be movable in a direction crossing a movement direction of the moving body with respect to the moving body;
a measurement head moving device capable of moving the measurement head with respect to the moving body;
a plurality of measurers supported to be movable in the same direction as a movement direction of the measurement head with respect to the measurement head; and
a measurer holding mechanism capable of holding the measurer at an advance position which advances as well as retreats,
wherein the plurality of measurers includes a first measurer having a first size insertable in the hole formed in the examined member when the hole is larger than a minimum tolerance and a second measurer having a second size which is not insertable in the hole formed in the examined member when the hole is smaller than a maximum tolerance.

2. The hole examining device according to claim 1, wherein the measurer is movable to a first measurement position inserted into a hole of an examined member and movable to a second measurement position that retreats by contacting an examined object when the measurement head advances by the measurement head moving device.

3. The hole examining device according to claim 1, wherein the first measurer and the second measurer are close to each other with a predetermined interval and further, are arranged in plural in a movement direction of the moving body at a regular interval, respectively.

4. The hole examining device according to claim 1, comprising:
a position detector detecting a movement position of the measurer with respect to the measurement head; and
a determination device determining whether the hole of the examined member is good or bad based on a detection result of the position detector.

5. The hole examining device according to claim 1, wherein a moving body moving device moving the moving body, a positional detector detecting a movement position of the moving body, and a control device controlling the moving body moving device based on a detection result of the positional detector are installed, and the control device moves the moving body every one unit by setting a distance corresponding to the number of the measurers in an arrangement direction of the measurer as one unit, and the measurer which is positioned at an end of the arrangement direction moves to face a hole formed at an end of the examined member.

6. The hole examining device according to claim 1, wherein each of the measurers comprises:
an examination body which is formed in a sphere with a spherical outer peripheral surface and is disposed at a front end of the measurer; and
a supporting portion which movably supports the examination body on the spherical outer peripheral surface.

* * * * *